(12) United States Patent
Milne et al.

(10) Patent No.: US 7,779,340 B2
(45) Date of Patent: Aug. 17, 2010

(54) INTERPOLATED TIMESTAMPS IN HIGH-SPEED DATA CAPTURE AND ANALYSIS

(75) Inventors: Andrew James Milne, Sierra Madre, CA (US); Paul Gentieu, Sunnyvale, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 351 days.

(21) Appl. No.: 11/082,791

(22) Filed: Mar. 17, 2005

(65) Prior Publication Data

US 2006/0248106 A1    Nov. 2, 2006

(51) Int. Cl.
*H04L 1/00* (2006.01)
*G06F 7/02* (2006.01)

(52) U.S. Cl. .................. 714/799; 714/819; 707/690

(58) Field of Classification Search .............. 707/102, 707/1; 370/537; 714/712, 746, 799, 819, 714/820, 821, 704, 822
See application file for complete search history.

(56) References Cited

U.S. PATENT DOCUMENTS

| | | | |
|---|---|---|---|
| 5,027,297 A | 6/1991 | Garitty et al. | |
| 5,590,116 A | 12/1996 | Zhang | |
| 5,696,701 A | 12/1997 | Burgess et al. | |
| 5,761,424 A | 6/1998 | Adams et al. | |
| 5,812,529 A | 9/1998 | Czarnik et al. | |
| 5,850,386 A | 12/1998 | Anderson et al. | |
| 5,912,701 A | 6/1999 | Morton, Jr. | |
| 6,049,545 A | 4/2000 | Stephenson et al. | |
| 6,058,116 A | 5/2000 | Hiscock et al. | |
| 6,098,157 A | 8/2000 | Hsu et al. | |
| 6,243,834 B1 | 6/2001 | Garrett | |
| 6,266,789 B1 | 7/2001 | Bucher et al. | |
| 6,335,931 B1 | 1/2002 | Strong et al. | |
| 6,507,923 B1 | 1/2003 | Wall et al. | |
| 6,636,518 B1 | 10/2003 | Liencres | |
| 6,639,957 B2 | 10/2003 | Cahill-O'Brien et al. | |
| 6,654,356 B1 | 11/2003 | Eidson et al. | |

(Continued)

FOREIGN PATENT DOCUMENTS

EP    0726664    8/1996

(Continued)

OTHER PUBLICATIONS

Web page: Outstanding PC, Webopedia, Routing in the Internet.

(Continued)

*Primary Examiner*—Don Wong
*Assistant Examiner*—Angela M Lie
(74) *Attorney, Agent, or Firm*—Matthew A. Pequignot; Pequignot + Myers LLC

(57) ABSTRACT

Methods and apparatuses for using interpolation to associate timestamp values to data received in a data capture and analysis system. An analysis processor receives data representing data transferred in a communications link. The analysis processor also receives timestamp signals. The analysis processor performs an interpolation between at least two timestamp values received and associates results of the interpolation with the data. The analysis processor analyzes the data. A logic device can be coupled to the analysis processor to interleave timestamp signal values with the data and transmit the interleaved data and timestamp signals to the analysis processor.

17 Claims, 5 Drawing Sheets

U.S. PATENT DOCUMENTS

| | | | |
|---|---|---|---|
| 6,665,725 B1 | 12/2003 | Dietz et al. | |
| 6,789,182 B1 | 9/2004 | Brothers et al. | |
| 6,793,539 B1 | 9/2004 | Lee et al. | |
| 6,915,466 B2* | 7/2005 | Mastro et al. | 714/712 |
| 2004/0170383 A1* | 9/2004 | Mazur | 386/68 |
| 2004/0244049 A1* | 12/2004 | Hahin et al. | 725/120 |
| 2005/0175321 A1* | 8/2005 | Aridome et al. | 386/95 |

FOREIGN PATENT DOCUMENTS

| | | |
|---|---|---|
| WO | WO 01/52400 | 7/2002 |

OTHER PUBLICATIONS

Web page: Internetweek.com, Schultz, Keithe, A Complete Solution, Enterasys Networks proves its mettle in enterprise-class switching, Jan. 22, 2001.

U.S. Appl. No. 10/764,095, filed Jan. 23, 2004, Durham et al.

U.S. Appl. No. 10/764,059, filed Jan. 23, 2004, Durham et al.

Web page: Marvell Press Release, Galileo Announces New High-Performance 240-port Ethernet Switch Reference Design, 1999.

* cited by examiner

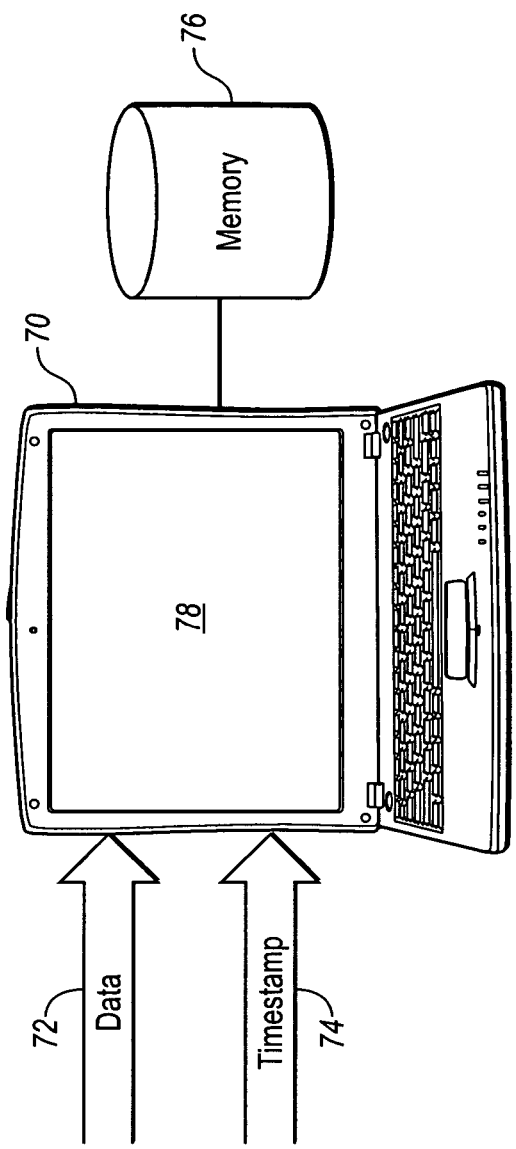
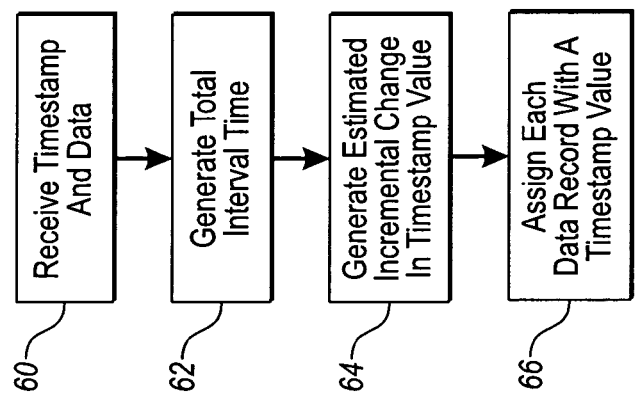
Fig. 3
Fig. 2

INTERPOLATED TIMESTAMPS IN HIGH-SPEED DATA CAPTURE AND ANALYSIS

BACKGROUND OF THE INVENTION

1. The Field of the Invention

The present invention relates generally to high-speed data capture and analysis. More specifically, the present invention relates to timestamping of captured data for analysis and troubleshooting.

2. The Relevant Technology

Data communication systems typically use a variety of different data transmission mechanisms to enable communication between and among associated subsystems. Each transmission mechanism is associated with a particular transmission, or communication, protocol that defines various parameters concerning the transmission of data in connection with the transmission mechanism. Such communication protocols commonly specify, for example, the manner in which data is encoded onto a transmission signal, the particular physical transmission media to be used with the transmission mechanism, link layers, and other attributes concerning the transmission environment.

As data moves from a point of origin to a destination by way of communication links, the data passes through a variety of devices collectively representing multiple protocols and types of hardware. Typically, each device modifies the data so that the data can be transmitted by way of a particular communication link. However, modification of the data in this manner often causes errors or other problems with the data. Such errors may occur as the result of various other processes and conditions in the mechanisms as well. Moreover, data errors and other problems present at one location in the data stream can cause additional errors or other problems to occur at other locations in the data stream and/or at other points in the communications system and associated links.

One approach to problem identification, analysis, and resolution in communications systems involves capturing a portion of the data communicated in a link for review and analysis. As used herein, "communications link" can also refer to data transfer links, network links, optical links, copper links, wireless links, etc. In some cases, such data capture is performed in connection with a network analyzer. A network analyzer can include various hardware and software elements configured to capture data from one or more communications links in the communications system, and present the captured data in various formats to a user or technician by way of a graphical user interface or other device.

Generally, such network analyzers capture data traffic in the communications system over a defined period of time, or in connection with the occurrence of predefined events. Use of an analyzer can allow a network administrator to track the progress of selected data as that data moves across the various links in the communication system. Corrupted or altered data can then be identified and traced to the problem link(s), or other parts of the communications system.

Captured data is often tracked in time using timestamps. Timestamps are time dependant records, signals, or values that can be associated with the data records as the data records are received at a particular location within the capture and analysis system. Depending on the type of system, data records and other portions of the data stream can also be referred to as packet, signal, word, frame, block, cell, segment, etc. Timestamps can be assigned to particular data records at predetermined intervals as the data records are received by the analyzer. In some instances, the timestamps can be interleaved with the data records and can be stored in the analyzer's memory buffer along with the captured data. The stored timestamps can later be used to identify when the data passed the certain location in the capture and analysis system. Timestamps are also important for producing an accurate time dependant depiction of the network activity for presentation to a user.

Measuring the time between data records received (word time) may actually be a useful measurement to make. However, the measurement of an acceptably accurate word time has not been implemented because a conventional clock used with an analyzer is typically not precise enough in certain high-speed applications (e.g. 10 Gbps). As a result, accuracy is limited by the number of data records captured between the timestamps and by the precision of the clock.

Instead, timestamp records are often interleaved with the captured data records and spaced between multiple captured records at predetermined intervals. For example, timestamp records can be interleaved with the captured data records by inserting a timestamp record at intervals of 128 data records or 2048 data records. To determine when the data that is intermediate to the timestamps was received, a "theoretical" word time can be used. A theoretical word time is an estimate of the actual time between data records received. Thus, where a data record being examined was received 50 data records after a first timestamp, an amount of time equal to 49 data records worth of time (i.e. 49 multiplied by the theoretical word time) can be added to the first timestamp value to get the theoretical arrival time of that 50th data record.

One problem encountered with this method of timestamp calculation is that the rate at which a network communication system transmits data is not entirely constant. Many factors can affect the rate at which data is transferred. This is especially so with high speed data transfer systems and small increments of timestamp precision. Even small changes in transfer rate can create problems when tracking data captured at high rates of speed (e.g. 1-10 Gbps). In some instances actual word time on a wire can vary around the ideal word time by approximately 100 parts per million.

The above described technique for tracking data in time can cause problems where the real time capture rate is less than expected, and the calculated timestamps assigned to the intervening data records overlaps a second actual timestamp record. For example, consider a system inserting actual timestamp records every 128 captured data records where the 127th captured data record is associated with a calculated timestamp record of 126 theoretical word time values added to the previous actual timestamp record. If the following actual timestamp record (i.e. the 128th timestamp record) is clocked into memory an instant before the 127th calculated timestamp record is about to increment, then that 128th timestamp record would be lower than the calculated timestamp record assigned to the 127th captured record. As a result, the 128th captured data record is associated with an actual timestamp record having an earlier timestamp value than the calculated timestamp value associated with the 127th data record. This can be referred to as "a negative delta time". Negative delta time causes problems in modeling, presenting, and tracking the captured data. Even an overlap of 5 nanoseconds can create several problems in high speed data capture and analysis systems.

To work around these issues, conservative "hard coded" word times have been used (for example 2.7 nanoseconds in a 10 Gbps system). This underestimated conservative word time guarantees that all timestamps increase monotonically with the existing source code. The disadvantage to this approach is that, when viewing data with the analyzer, each data record appears to be clocked in slightly faster than it should have. Also, small gaps in time show up on a regular basis, which are required to keep synchronized with the real-time values of the actual timestamps.

A conservative word time prevents the negative delta time problem. Even still, in these instances the accuracy at which the timestamps are associated with the data records is not ideal. In addition, the small gaps in time that appear from this method of tracking data may confuse a user because the gap in time depicted is merely an artifact created by the shift from a calculated timestamp value (based on a conservative word time) to an actual timestamp value (based on a hardware clock signal). These gaps can cause data to appear skewed when comparing data across multiple channels.

Thus, what would be advantageous are methods and apparatuses for accurately tracking data received by a data capture and analysis system in time.

BRIEF SUMMARY OF THE INVENTION

The present invention relates to methods and apparatuses for timestamping captured data for analysis and troubleshooting. According to an embodiment of the present invention, a data capture and analysis device is described. The data capture and analysis device can include an interface configured to receive data representing data communicated in a communications link, an interface configured to receive periodic timestamps, and a processor that receives the data and the timestamps and performs an interpolation between at least two timestamps and associates results of the interpolation with at least portions of the data.

According to an embodiment of the present invention, a method for associating timestamp records to data records received in a data analysis apparatus is described. The method can include receiving a first timestamp, receiving a second timestamp, receiving a plurality of data records representing data transferred in a communications link, the plurality of data records including a first data record associated with the first timestamp and a second data record associated with the second timestamp, the plurality of data records further including intermediate data records that are received intermediate to the first and second data records, and calculating intermediate timestamp values using interpolation of the first and second timestamp signals, wherein the intermediate timestamp values are intermediate to the first and second timestamp signals.

According to an embodiment of the present invention, a method for capturing and analyzing data communicated in a communications link is described. The method can include receiving a first timestamp; receiving a second timestamp, receiving a plurality of data records, calculating intermediate timestamps that are intermediate to the first timestamp and the second timestamp using interpolation between the first timestamp and the second timestamp, associating one or more of the intermediate timestamps with one or more of the plurality of data records, and conducting analysis of the data records.

Additional features and advantages of the invention will be set forth in the description which follows, and in part will be obvious from the description, or may be learned by the practice of the invention. The features and advantages of the invention can be realized and obtained using the instruments and combinations particularly pointed out in the appended claims. These and other features of the present invention will become more fully apparent from the following description and appended claims, or can be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 is a block diagram illustrating a method for assigning intermediate timestamp values using interpolation according to an example embodiment of the present invention;

FIG. 3 illustrates a data analysis apparatus according to an example embodiment of the present invention;

DETAILED DESCRIPTION OF THE PREFERRED EMBODIMENTS

The present invention relates to capture and analysis of data communicated in a communications link. The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Detailed descriptions of well-known components and processing techniques are omitted so as not to unnecessarily obscure the invention in detail.

The embodiments of the present invention may comprise a special purpose or general-purpose computer, processor, or logic device including various computer hardware and devices, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose computer, special purpose computer, or other processing device. When information is transferred or provided over a network or another communication connection (either hardwired, wireless, or a combination of hardwired or wireless) to a computer, the computer properly views the connection as a computer-readable medium. Thus, any such connection is properly termed a computer-readable medium. Various combinations of the above should also be included within the scope of computer-readable media. Computer-executable instructions comprise, for example, instructions, logic, and data which cause a general purpose computer, special purpose computer, or special purpose processing device to perform a certain function or group of functions.

Figure 1:
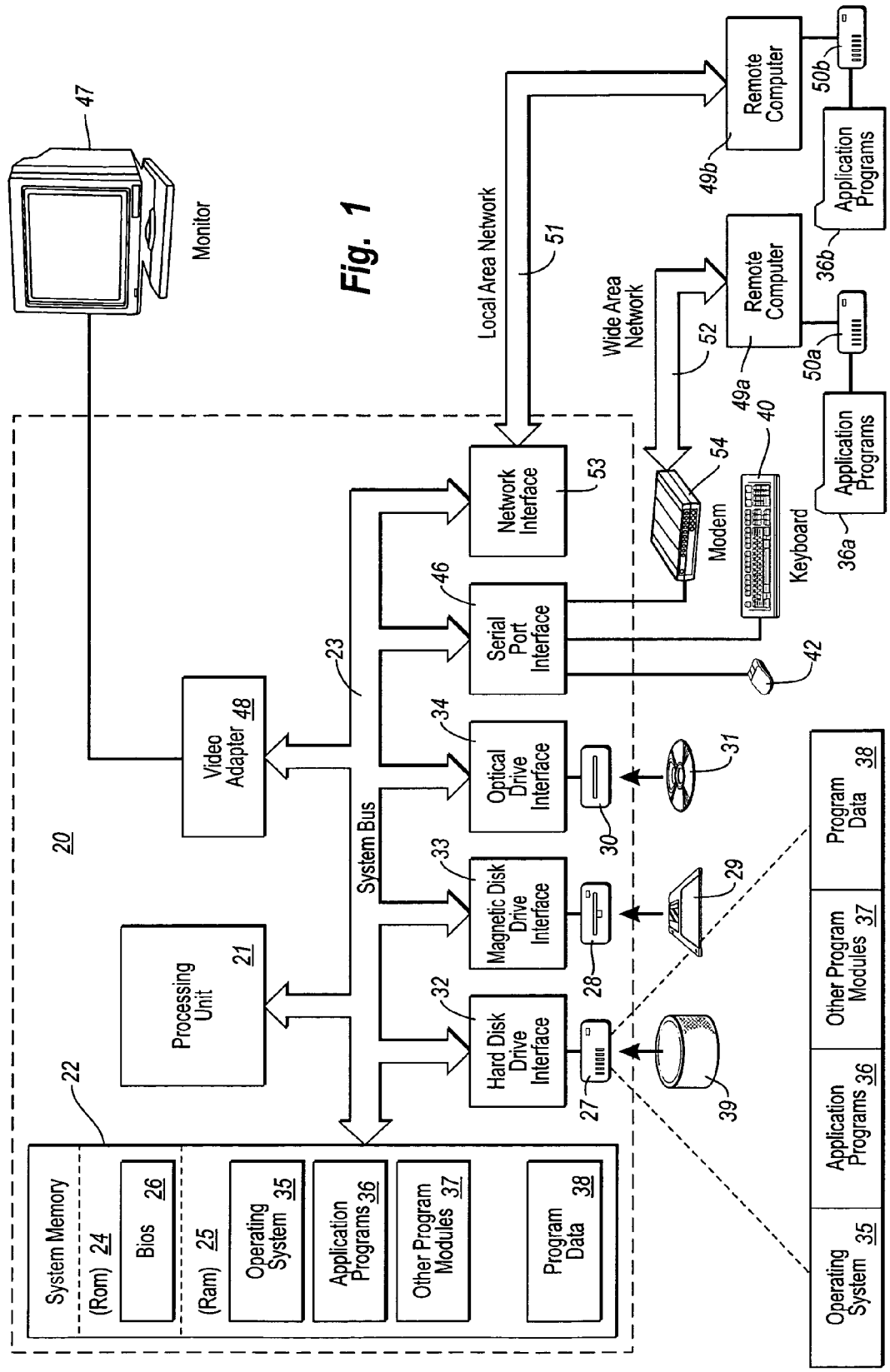
FIG. 1 illustrates a suitable computer processing environment in which at least certain aspects of embodiments of the invention may be implemented.

FIG. 1 and the following discussion are intended to provide a brief, general description of a suitable computer processing environment in which at least certain aspects of embodiments of the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. These acts and steps can be performed on a computer as described, or may be performed at least in part using other logic devices executing instructions implemented as logic loaded onto the logic device.

Those skilled in the art will appreciate that the invention may be practiced in network computing environments with many types of computer system configurations, including personal computers, hand-held devices, multi-processor systems, microprocessor-based or programmable electronic devices, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an example of a system for implementing at least certain aspects of embodiments of the present invention can include a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device may also be connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link; or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the, remote memory storage device. It will be appreciated that the network connections shown are examples, and other means of establishing communications over wide area network 52 may be used.

One aspect of the present invention includes methods and apparatuses for calculating and associating timestamps with captured data that is received intermediate to timestamp signals received. The captured data can be received by a network analysis processor. Periodic timestamp records can be embedded in the captured data or can be received by the processor separately from the captured data. The periodic timestamps can indicate arrival times of the received data at a particular location in the capture and analysis apparatus.

According to example embodiments of the present invention, interpolation of the periodic timestamp can be used in conjunction with the processor to determine the arrival time of intermediate data that appears between the periodic timestamps. For example, embodiments of the present invention can use linear interpolation to calculate the average word time on the wire instead of using a predicted conservative value of the theoretical word time as discussed above.

Linear timestamp interpolation calculations of intermediate timestamp values between periodic timestamp signals can be used according to embodiments of the present invention. However, extrapolation and more complicated non-linear interpolation can also be used to calculate intermediate timestamp values according to other embodiments of the present invention. Moreover, the interpolation can take into consideration any compression of the data as well as other aspects of the data during the interpolation calculations. Accordingly, greater accuracy for estimating the time that data is received at a location within the capture and analysis system can be achieved than that using a conservative word time as discussed above. The present invention can also eliminate the possibility of positive or negative time gaps (e.g. negative delta time) in the capture analysis that was experienced using the theoretical and conservative word time.

Referring to FIG. 2, depicted is a block diagram illustration of a method for assigning intermediate timestamp values to data according to an example embodiment of the present invention. The method can include receiving at least two actual timestamp signals along with intermediate data records, as represented by block 60. For instance, a first timestamp signal ($T_i$) and a second timestamp signal ($T_{si+1}$) can be received, along with the data propagating between the signals. The value of the earlier timestamp signal received can be subtracted from the value of the later timestamp signal value to calculate the total timestamp value ($T_{Tot}$) elapsed between the two timestamps, as represented by block 62. For instance, $T_{Tot}=T_{si+1}-T_i$. $T_{Tot}$ can be divided by the number of intervening data records to get an estimated incremental change in time between data records, i.e. arrival timestamp value per data record received ($\Delta T$), as represented by block 64. $\Delta T$ can be multiplied by the consecutive number of a particular data record from the initial timestamp signal received to obtain a calculated intermediate timestamp value for the particular intermediate data record ($TS_n$) as represented by block 66. For instance, if we define each data record as $N_n$, then the initial timestamp for each intermediate data record ($TS_n$) can be calculated by $TS_n=N_n*\Delta T+TS_i$.

Different apparatuses can be implemented to practice the methods of the present invention. Moreover, different apparatuses can be used to achieve a given function, step, or act according to example embodiments of the present invention. Referring to FIG. 3, a data analysis apparatus is illustrated according to an example embodiment of the present invention. The apparatus can include an analysis processor 70 (such as computer 20 in FIG. 1) configured to receive data 72 communicated in a communications link. The data 72 received can be the actual data communicated in the communications link, or the data 72 can be a copy of the data communicated in the communications link. The analysis processor 70 is further configured to receive timestamps 74 (e.g. timestamp signals from a clock) and associate at least portions of the data 72 received with at least portions of the timestamps 74.

The analysis processor 70 can associate the appropriate timestamps 74 with the appropriate data records 72. For example, the timestamps 74 can be associated with the data 72 by either being embedded at the relevant location in the data 72 as timestamps records, or the timestamps 74 can be positionally dependent with the data 72 (e.g. there can be one timestamp 74 for each 1000 data record 72). The timestamps 74 can include meta data that associates the timestamp 74 directly with the data's 72 position.

Timestamps 74 can be sampled at a predetermined interval. The timestamps 74 and the data records 72 can be associated at predetermined intervals as desired such that there are a number of intermediate data records that are not associated with the timestamps 74, but are in between data records that are associated with timestamps 74. Intermediate pieces of data communicated in the communications link that are intermediate to the predetermined intervals are assigned intermediate calculated timestamp values. The intermediate timestamps are calculated by the analysis processor 70 by interpolating between the timestamp 74 associated with the data 72 at the predetermined intervals. Linear or nonlinear interpolation can be conducted by the analysis processor 70 and any compression of the data 72 in the communications link or in the analysis system can be taken into consideration in the calculation.

For example, if the capture format uses a run length compression algorithm to compress duplicate data records, a single data record combined with a count can represent multiple data records on the link. Thus two data records can represent N number of records on the communications link, where the 1st record represents the actual data on the link and a following record stores the number of repeated duplicate records. Another example occurs in Fibre Channel when the link goes idle. In this instance, the same data record is repeated on the link during this idle period. When calculating the number of words on the link between two timestamp records it is important to include these compression records with their true count. For example, if there were a million idles compressed into these two data records then those two data records are counted as a million records on the wire. These, as well as other types of compression can be taken into account in the interpolation techniques of the present invention.

Intermediate timestamps can be associated with every intermediate data record, or can be assigned to intermediate data records at predetermined intervals. After the intermediate timestamps have been assigned to the intermediate data records using interpolation, analysis of at least a portion of the data 72 can be conducted by the analysis processor 70. Analysis can be performed for any purpose. For example analysis can be conducted using well known techniques, such as, but not limited to packet decoding, 10/8 bit conversion, running disparity verification, CRC validation, protocol conformance, etc. The analysis can also be conducted for any purpose, such as but not limited to identifying passwords, to identify protocol errors, Voice over IP, virus activity, performance issues, etc. Results of the analysis can be presented to a user using a display 78 or other output device. The data 72 can also be stored in memory 76 along with any, or all, of the associated timestamp records. The memory 76 can be internal or external to the analysis processor 78.

It should be appreciated that multiple data processing machines and logic devices can be implemented to perform the functions, steps, and acts described above, as well as others. Moreover, multiple functions steps, and acts can be performed using a single apparatus, such as a computer processor, data processing machine, or logic device according to embodiments of the present invention. For example, a data processing machine, or logic device, separate from the analysis processor 70 can perform the association and interpolation of timestamp records with the data records prior to the data and timestamps being received and analyzed by the analysis processor 70.

Figure 4:
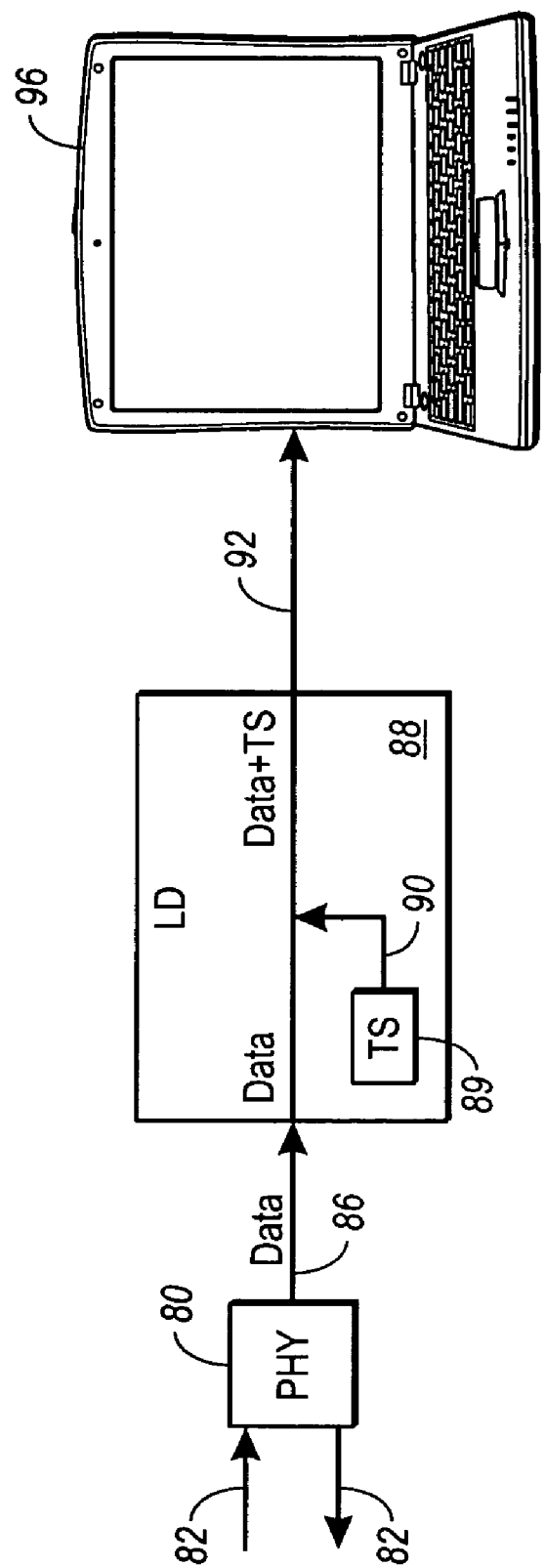
FIG. 4 illustrates a data capture and analysis apparatus according to an example embodiment of the present invention.

A logic device or processor can also be implemented in conjunction with an analysis processor to capture data from the communications link, and also for association of timestamp records with the data at predetermined intervals. FIG. 4 illustrates a data capture and analysis apparatus according to an embodiment of the present invention. The apparatus can include a physical connection 80, such as, but not limited to a tapping device coupled to a data communication network link 82. The physical connection 80 receives data communicated in a communications link 82, creates a copy of the data 86, transmits the data 86 to a logic device 88, and redirects the data 86 along the communications link 82. The logic device 88 receives the data 86 and interleaves periodic timestamp records 90 received from a timestamp source (TS) 89 into the data 86 at predetermined intervals, or intervals manually set prior to or during the operation of the logic device 88.

An analysis processor 96 can be coupled to the logic device 88 and can receive data with embedded timestamp signals 92 from the logic device 88. The analysis processor 96 can identify the embedded timestamp signals using a parser or other means, calculate intermediate timestamp values using interpolation techniques, and associate the intermediate timestamp values with the intermediate data received. The analysis processor 96 can conduct network protocol analysis, or other analysis, on the data 86 to identify network protocol errors in the data 86 communicated in the communications link 82. The analysis processor 96 can also conduct analysis to identify other types of errors or conduct analysis for other purposes. Results of the analysis can be presented to a user, saved to memory, or output to a file or printer, for example. The data 86 communicated in the communications link 82 and associated timestamps 90 can also be saved to computer readable media.

Figure 5:
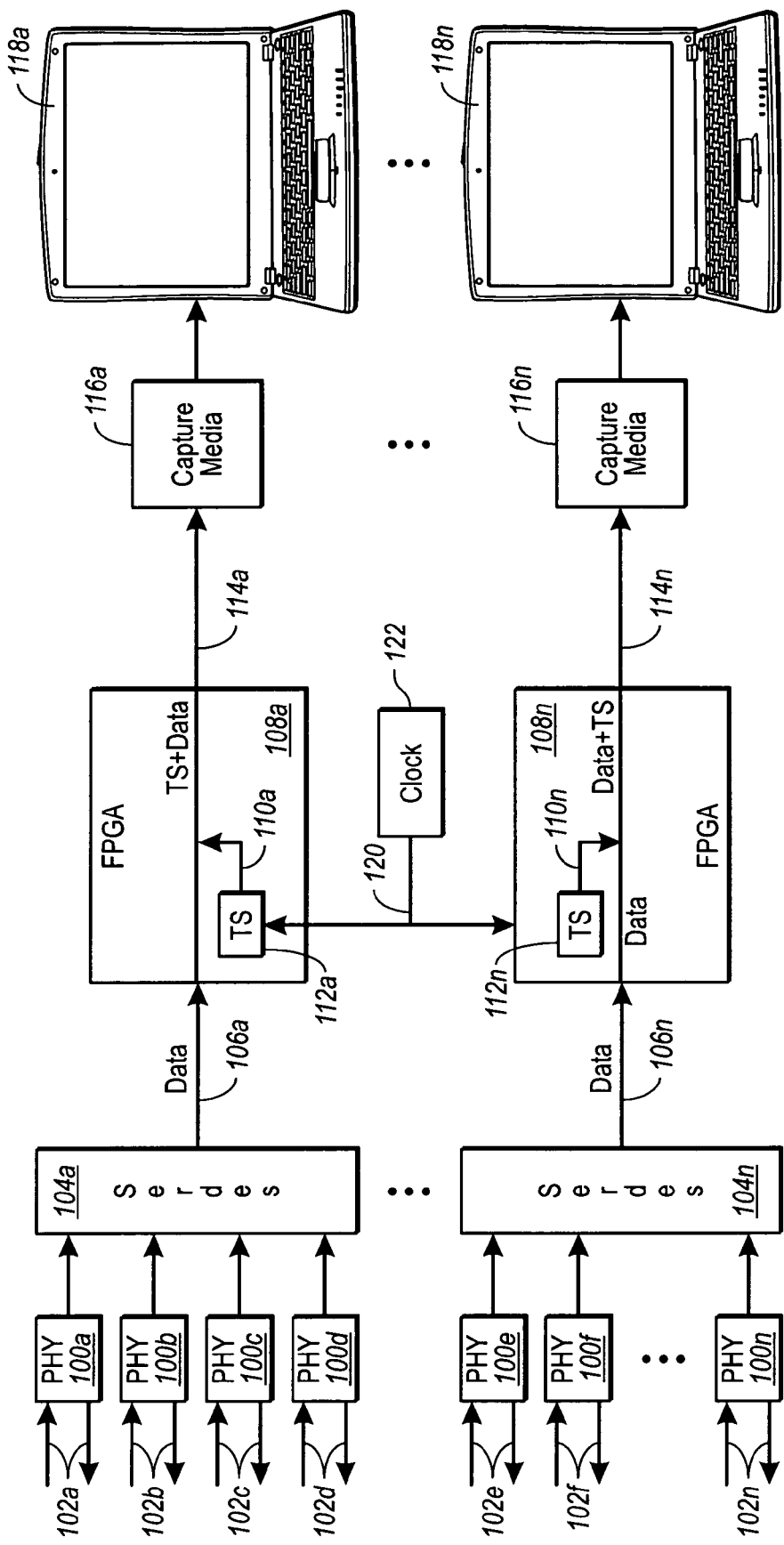
FIG. 5 illustrates a data capture and analysis system according to an example embodiment of the present invention.

Referring now to FIG. 5, a data capture and analysis system is shown according to an example embodiment of the present invention. As shown, the system can include multiple physical connections 100a-n (e.g. tapping devices). The multiple physical connections 100a-n can be connected to multiple communications links 102a-n (or multiple network links) for creating a copy of data communicated in the communications links 102a-n. The system shown in FIG. 5 can be a high speed capture and analysis system. For example, the system can receive data being transmitted at a rate between about 1 Gbps and 10 Gbps. The system can be implemented, however, to receive data being transmitted at any rate. For example, the invention can be implemented in 1.25 Ghz Ethernet analyzers, 8.5 Ghz Fibre Channel analyzers, 4 Ghz Fibre channel analyzers, 2 Ghz Fibre channel analyzers and 1 Ghz Fibre channel analyzers, as well as many others Two serializer-deserializers (SERDES) 104a-n can receive the data communicated in the communications links 102a-n from the physical connections 100a-n, serialize the data received, and forward the serialized data 106a-n to field programmable gate arrays (FPGAs) 108a-n. The serialized data 106a-n can be received by the FPGAs 108a-n and embedded with timestamp signals 110a-n by timestamp interleavers 112a-n. According to this embodiment, the timestamp signals 110a-n can indicate the arrival time of the data at the FPGAs 108a-n. However, the timestamp signals 110a-n can also indicate arrival times at other points in the capture and analysis system. The timestamp signals 110a-n can be based on a clock signal 120 received by the FPGA's 108a-n. The clock signal 120 can be provided by a common clock 122 that is external to both FPGAs 108a-n. The timestamp interleavers 112a-n can increase the frequency of the clock signal 120 to a desired precision for insertion as the timestamp values 110a-n into the serialized data 106a-n received by each FPGA 108a-n.

The shared clock between the separate FPGAs can be of a low frequency where design constraints make a low frequency desirable. For example, using a Phase Lock Loop, a 50 MHz clock can be multiplied a few times and using rising and falling clocking techniques it's possible to get the 50 MHz signal to clock a counter at a few nanoseconds per bit. This technique can be used for each FPGA 108a-n so that sharing the 50 MHz signal between the FPGAs 108a-n can be used to give each FPGA 108a-n a lock stepped clock with a period of a few nanoseconds. Thus intra channel timing can be achieved down to a few nanoseconds. In this manner, the same clock signal 120 can be received by multiple logic devices (i.e., FPGAs 108a-n) allowing for synchronization of multiple analysis processors 118a-n in time.

The data with interleaved timestamp values 114a-n can be received by, and stored in computer accessible capture media 116a-n. The capture media 116a-n can store the data with interleaved timestamp values 114a-n for access by the analysis processors 118a-n that can be coupled to the capture media 116a-n. It should be appreciated that the capture media 116a-n can be an integral part of, or separate from, the analysis processors 118a-n or other device. In addition, multiple analysis processors 118a-n can be coupled to a single capture media 116a-n to retrieve and analyze data there from. The analysis processors 118a-n access the data with interleaved timestamp values 114a-n stored in the capture media 116a-n and identify the interleaved timestamp values.

The analysis processors 118a-n can perform interpolation using the interleaved timestamp values to calculate intermediate timestamp values for each piece of data 106a-n. For example, the interval at which the timestamp values 110a-n can be embedded can be once every 128 data records. In such example embodiments, the analysis processors 118a-n can use interpolation techniques to assign intermediate timestamp values to each of the 127 data records that are intermediate to data records with associated embedded timestamp records. The interpolation conducted in the data capture and analysis system can also take into account any compression or alteration of the data communicated in the communications link. The type of interpolation can be linear or non-linear. In some instances, extrapolation can also be conducted to calculate timestamps beyond a timestamp interval.

The analysis processors 118a-n can next perform analysis of the data 106a-n. The analysis processors 118a-n can present results of the analysis to a user using a display or other output device. The analysis processors 118a-n can also output the results to a printer or memory. The calculated intermediate timestamp values can be stored in a memory along with the embedded timestamp values for later access, presentation to a user, or additional analysis.

Figure 6:
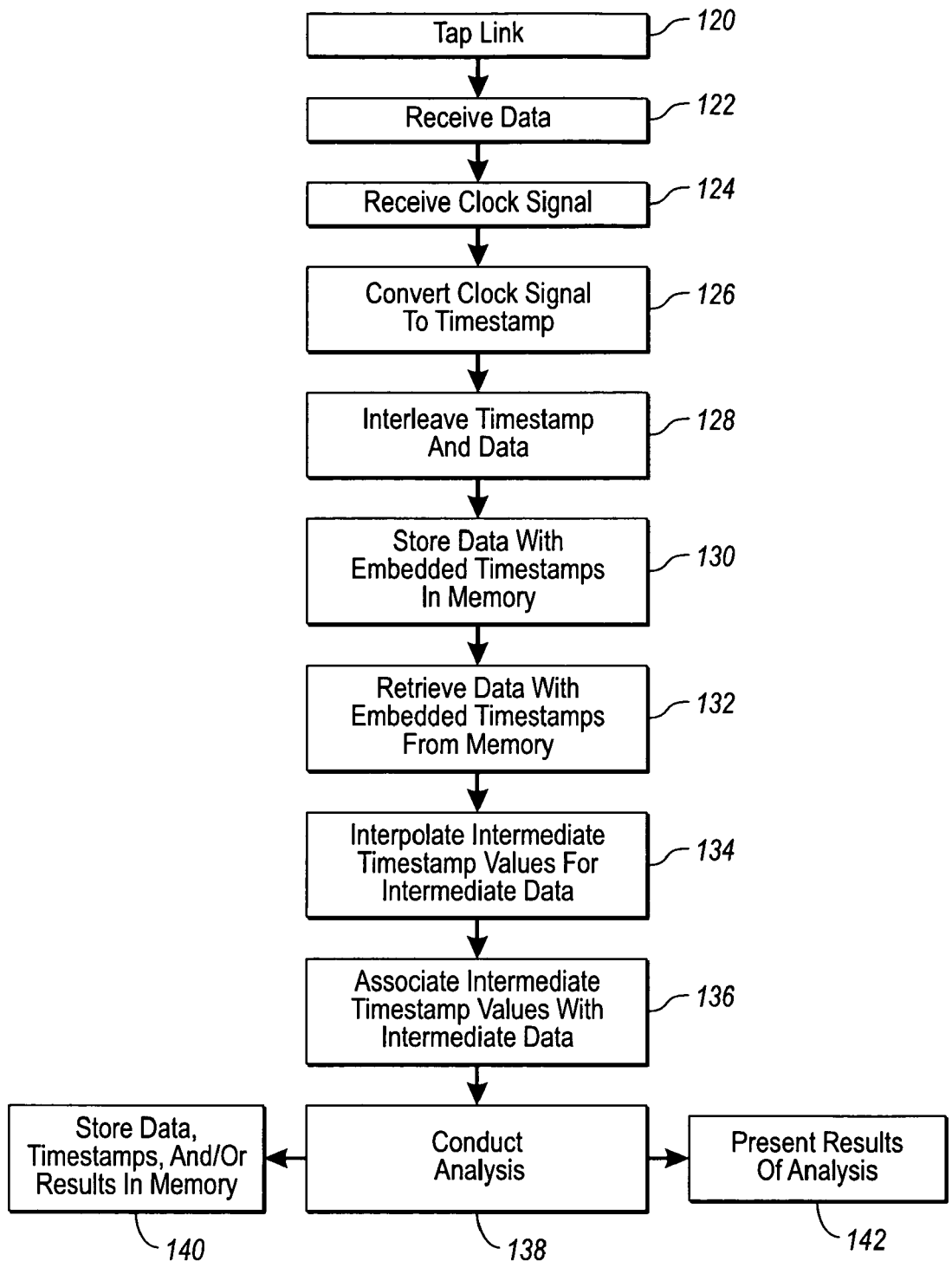
FIG. 6 is a block diagram illustrating a method for capturing and analyzing data communicated in a communications link according to an example embodiment of the present invention.

Referring now to FIG. 6, a method for capturing and analyzing data communicated in a communications link is illustrated according to an example embodiment of the present invention. The method can include tapping a communication link, as represented by block 120. With the link tapped, the method can include receiving data communicated in a communications link, as represented by block 122. A timestamp signal can be received from a clock, as represented by block 124 and the timestamp signal can be converted in frequency to a desired timestamp signal precision, as represented by block 126. The timestamp signal can be interleaved with the data, as represented by block 128. The interleaved timestamp signal and data can be stored in memory, as represented by block 130. The interleaved data and timestamp signal can be retrieved from the memory as represented by block 132. Interpolation can be conducted to calculate intermediate timestamp values, as represented by block 134. The intermediate timestamp values can be associated with intermediate data, as represented by block 136. Analysis of the data can be conducted, as represented by block 138. For example, the analysis can be conducted to determine whether the data communicated in the communications link includes errors, such as protocol errors, or for other reasons. The results of the analysis can be presented to a user, as represented by block 142. The data and associated timestamps can be stored separately or together, as represented by block 140.

The example method presented in FIG. 6 can be practiced in many different network capture and analysis apparatuses. For example, the method can be practiced in many conventional systems operating at any speed, or can be practiced in special purposes devices such as those described herein as well as others. The data received by the analysis systems can be the actual data that is transmitted and received by a data capture apparatus, or can be a copy of data communicated in a communications link. The physical connection can be a tapping apparatus, the manufacture and implementation of which are generally well known in the art.

In some instances, interpolation techniques of certain embodiments of the present invention can allow a relatively low resolution timestamp engine to be used for speeds higher than it would normally be capable of (e.g. possibly not requiring re-architecture of an analyzer). Interpolated timestamps can also give timestamp values much closer to the real word times on the wire, thus making an analyzer appear more accurate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data capture and analysis device, comprising:
a first tap for receiving data, wherein the tapped data represents data communicated in a first communications link at a rate between about 1 Gbps and 10 Gbps, wherein the data in the first communications link is allowed to continue on to its intended destination;
an interface configured to receive the tapped data;
a logic device configured to receive the tapped data and to interleave timestamps received from a timestamp source into the tapped data; and
a processor configured to receive the tapped data and the timestamps from the logic device and perform a linear or non-linear interpolation between at least two timestamps and to calculate intermediate timestamps and associate intermediate timestamps to at least portions of the tapped data, wherein the data capture and analysis device is configured to capture data at a rate between about 1 Gbps and 10 Gbps,
wherein the interpolation conducted in the data capture and analysis device takes into account compression of the tapped data.

2. The device of claim 1, wherein the processor or a different processor analyzes the tapped data.

3. The device of claim 2, wherein the processor that analyzes the tapped data analyzes the tapped data for at least one of protocol conformity errors, packet decoding errors, 10bit conversion errors, 8bit conversion errors, running disparity verification, CRC validation, identification of passwords, Voice over IP, virus activity, and performance issues.

4. The device of claim 1, wherein the logic device is further configured to interleave the timestamps into the tapped data at predetermined intervals or intervals manually set prior to or during the operation of the logic device.

5. The device of claim 1, wherein the logic device is further configured to receive a clock signal, wherein the timestamps are based at least in part on the clock signal received by increasing the frequency of the clock signal.

6. The device of claim 2, further comprising:
at least one of a computer readable media coupled to the analysis processor for storing the tapped data, the timestamps, and a result of the interpolation and an output device for presenting a result of the analysis to a user.

7. The device of claim 1, further comprising:
a second tap for receiving data, wherein the data tapped by the second tap represents data communicated in a second communications link at a rate between about 1 Gbps and 10 Gbps, wherein the data in the second communications link is allowed to continue on to its intended destination; and
a serializer-deserializer (SERDES) configured to receive and serialize the data tapped by the first and second taps, wherein the timestamps are interleaved into the serialized data.

8. A method for associating timestamps to data received by a data analysis apparatus, the method comprising:
tapping data at a rate between about 1 Gbps and 10 Gbps from a communications link, wherein the tapped data represents the data in the communications link as the data in the communications link is allowed to continue on to its intended destination;
receiving from a logic device a first timestamp, the logic device being configured to interleave timestamps into the tapped data; receiving from the logic device a second timestamp;
receiving a plurality of transferred data records from the logic device, the plurality of transferred data records including a first data record associated with the first timestamp and a second data record associated with the second timestamp, the plurality of transferred data records further including intermediate data records that are received intermediate to the first and second data records; and
calculating intermediate timestamp values using interpolation of the first and second timestamp signals, wherein the intermediate timestamp values are intermediate to the first and second timestamp signals,
wherein the plurality of data records is equal to N data records, wherein the first data record is the first received data record of the plurality of data records and the second data record is the Nth received data record of the plurality of data records wherein N is a number greater than 2.

9. The method of claim 8, further comprising:
associating the intermediate timestamp values with the intermediate data records.

10. The method of claim 8, further comprising:
storing at least one of the timestamp signals, the intermediate timestamp values, the first data record, the second data record, and the intermediate data records in at least one computer readable memory.

11. The method of claim 8, further comprising:
interlacing the first and second timestamp signals with the plurality of data records.

12. The method of claim 8, wherein the intermediate timestamp values are calculated at least in part using linear interpolation.

13. The method of claim 8, wherein the interpolation takes into account compression of the data records.

14. The method of claim 8, wherein the intermediate timestamp values are calculated at least in part using non-linear interpolation.

15. The method of claim 8, wherein the intermediate timestamp values are calculated at least in part using extrapolation.

16. The method of claim 8, wherein analysis includes analyzing the data for protocol conformity errors.

17. A data capture and analysis device, comprising:
a first tap for receiving data, wherein the tapped data represents data communicated in a first communications link at a rate between about 1 Gbps and 10 Gbps, wherein the data in the first communications link is allowed to continue on to its intended destination;
an interface configured to receive the tapped data;
a logic device configured to receive the tapped data and to interleave timestamps received from a timestamp source into the tapped data; and
a processor configured to receive the tapped data and the timestamps from the logic device and perform a linear or non-linear interpolation between at least two timestamps to calculate intermediate timestamps and to associate intermediate timestamps to at least portions of the tapped data, wherein the data capture and analysis device is configured to capture data at a rate between about 1 Gbps and 10 Gbps,
wherein, as part of the performance of interpolation, the processor of the data capture and analysis device is configured to adjust intermediate timestamps to take into account a compression format in which at least one data record represents a number of duplicate records that were repeated in the communications link.

* * * * *